(12) United States Patent
Anderson et al.

(10) Patent No.: US 7,183,483 B1
(45) Date of Patent: Feb. 27, 2007

(54) COVER FOR SURFACE MOUNTED ALARM UNIT

(75) Inventors: Douglas J. Anderson, St. Charles, IL (US); Curtis R. Davidson, Oswego, IL (US); Bojana Vojinovic, Elmhurst, IL (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/263,041

(22) Filed: Oct. 31, 2005

(51) Int. Cl.
*H02G 3/08* (2006.01)
(52) U.S. Cl. .................. 174/50; 174/58; 220/4.02; 439/535
(58) Field of Classification Search ............... 174/50, 174/53, 58, 66, 57; 220/4.02, 241, 3.6, 3.8; 248/906; 439/535, 166
See application file for complete search history.

(56) References Cited

U.S. PATENT DOCUMENTS

| | | | | |
|---|---|---|---|---|
| 3,621,112 A | * | 11/1971 | Stickley et al. | 174/50.52 |
| 4,725,249 A | * | 2/1988 | Blackwood et al. | 439/535 |
| 5,189,256 A | * | 2/1993 | Epple | 174/50 |
| 5,914,665 A | | 6/1999 | Thorp et al. | 340/691.1 |
| 6,768,055 B1 | * | 7/2004 | Gorin | 174/50 |

\* cited by examiner

*Primary Examiner*—Dhiru R. Patel
(74) *Attorney, Agent, or Firm*—Welsh & Katz, Ltd.

(57) ABSTRACT

A connection assembly includes a housing and a connector element. The connector element can be attached to the housing and the combined unit can be attached to an electrical box prior to affixing an electrical device thereto.

17 Claims, 7 Drawing Sheets

Fig. 12 ic unit coupled
COVER FOR SURFACE MOUNTED ALARM UNIT

FIELD

The invention pertains to surface mounted electrical units. More particularly, the invention pertains to connection assemblies for mounting such units to surface mounted electrical boxes.

BACKGROUND

The benefits of distributing safety, security or alarm related electrical output devices throughout a building or structure have been recognized. Such devices are often coupled to alarm systems which monitor the various regions of the respective building or structure for security, fire, gas or related dangerous ambient conditions.

In many instances buildings have walls or ceilings with surface mounted electrical or wire junction boxes. These boxes are often connected by surface mounted conduits to a central location associated with the alarm system. The conduits can carry signal/power wires between the central location and the various respective electrical output devices.

It is often desirable from an aesthetic point of view to cover the surface mounted boxes as part of installing an ambient condition detector, output device or other type of electrical unit. One such configuration which incorporates a molded plastic skirt for covering a surface mounted electrical box has been disclosed and claimed in Thorp et al. U.S. Pat. No. 5,914,665 issued Jun. 22, 1999 and entitled "Cover for Surface Monitored Alarm Unit". The Thorp et al. patent has been assigned to the Assignee hereof and is incorporated by reference.

In the structure of the Thorp et al. patent, electrical output units are directly coupled to wiring received from the respective surface mounted electrical box. From an installation point of view it would be desirable to be able to carry out the necessary connection to the wires from the respective electrical box without having to directly connect the respective electrical unit to those wires.

In view of the labor cost which include aligning and connecting the various elements to both electrically and mechanically attach an electrical unit to a surface mounted box it would be desirable to provide structures which make the process as efficient and cost effective as possible. Preferably such configurations could be used with ambient condition detectors, output devices of all types as well as other electrical units without limitation.

DETAILED DESCRIPTION

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In one aspect of a connection structure which embodies the present invention a housing or surround can be provided which covers an externally mounted electrical box. A mounting plate can be aligned and releasibly attached to the housing prior to installing same on the respective electrical box. Fasteners can be attached to the electrical box in advance.

The external surround or housing/mounting plate can be located in place surrounding the electrical box with the fasteners mounted in the box extending therethrough. The surround/plate can be rotated in to place to mechanically engage fasteners. The fasteners, screws for example, could be rotated into place to fixedly attach the surround/plate combination to the electrical box.

Electrical wires extending from the box can be attached to terminals of a terminal block on the mounting plate. An electrical unit such as an ambient condition detector, output device or other types of electrical units, without limitation, can be releasibly coupled mechanically to the mounting plate. The releasable mechanical coupling also provides for an electrical connection between the respective electrical unit and terminals on the mounting plate. The electrical unit can be fixedly attached to the mounting unit by fasteners, snaps, an interference fit all without limitation.

Alignment or snap details can be molded into the surround for the purpose of receiving and fixing the mounting plate in place. Alternately, bosses as well as various types of fasteners, including screws, could be used to attach the mounting plate to the surround prior to coupling same to the surface mounted electrical box.

In yet another aspect of the invention, skirts or surrounds can be provided to cover electrical boxes of a plurality of sizes. The mounting plates provide standardized interfaces, mechanically and electrically, for electrical units to be attached thereto. Such electrical units can have a variety of form factors such as round, square, elongated and the like, all without limitation provided they are electrically and mechanically compatible with the mounting plate configuration. Hence, advantageously, a standard mounting plate configuration makes it possible to readily install a variety of electrical units on respective surface mounted electrical boxes irrespective of the form factor of the respective electrical unit.

Further, in yet another aspect of the invention, the releasable connection initially provided between the mounting plate and the skirt or surround makes it convenient and very efficient for an installer to install the mounting plate/surround combination on an electrical box and fixedly attach the combined unit thereto due to the presence of keyed slots on the skirt or surround. Such keyed slots make it possible for enlarged heads of fasteners, such as screw heads, to pass through one portion thereof while at the same time, and in response to rotation of the skirt or surround, provide surfaces against which the respective head can engage when rotated or screwed into place.

Figure 1:
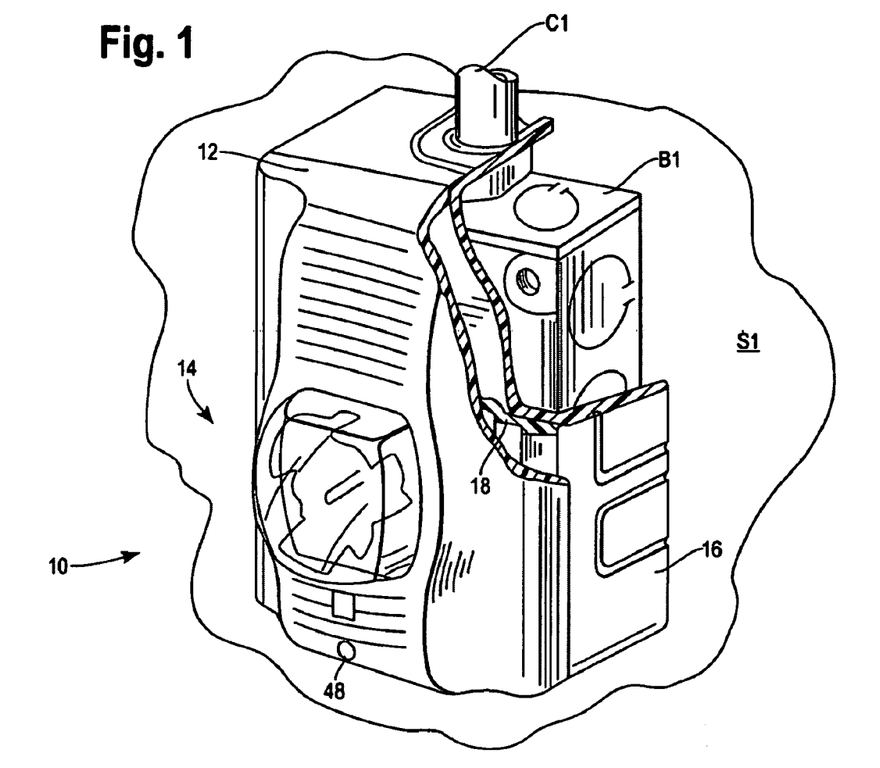
FIG. 1 is an isometric view of an electrical unit coupled to a surface mounted electrical box and broken away, in accordance with the present invention.
Figure 2:
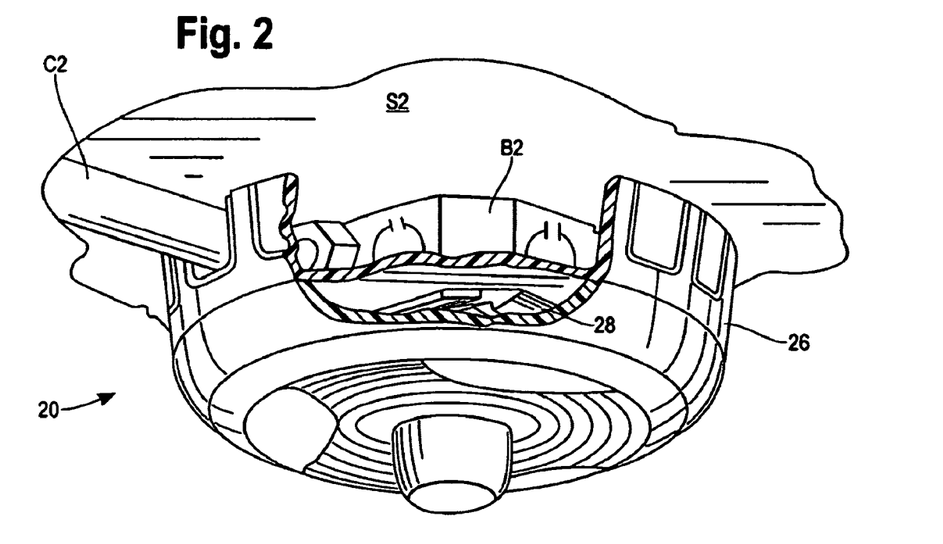
FIG. 2 is an isometric view, partially broken away, of a different electrical unit coupled to an exterior electrical box in accordance with the invention.

FIGS. 1 and 2 are partially broken away views illustrative of structures in accordance with the present invention being used with an elongated, generally rectangular output device 10, FIG. 1 and a cylindrical output device 20, FIG. 2. It will be understood that the electrical units 10, 20 are merely exemplary. The present connector system can be used with a wide variety of electrical units including ambient condition detectors, output devices, and other types of electrical units having a variety of form factors all without limitation.

Relative to FIG. 1, the unit 10 includes an exterior housing 12 which carries a visual output device indicated generally at 14 of a conventional variety. It will be understood that the unit 10 could be an audible output device, or other type of electrical unit, without limitation. The unit 10 is coupled to a surface mounted electrical box B1. Box B1 can assume a variety of shapes and sizes including rectangular, square, cylindrical all without limitation. Neither the configuration of the respective surface mounted box, nor the size or material thereof are limitations of the invention.

The box B1 has previously been mounted on a surface S1, for example a wall or ceiling. Electrical energy, signaling wires and the like can be fed from any selected source or fed to any selected destination via conduit C1 without limitation. Housing 12 of electrical unit 10 is fixedly attached to a skirt or surround 16 which encloses the surface mounted electrical box B1. A mounting plate or interface element 18 provides electrical and mechanical interconnections between the wiring and the conduit C1 and the electrical unit 10 as described in more detail subsequently.

FIG. 2 illustrates a ceiling mounted version of the configuration of FIG. 1. In FIG. 2 an electrical unit 20, which could be an output device, an ambient condition detector or other type of electrical device without limitation is fixedly attached to a ceiling, S2, mounted electrical box B2 which receives electrical energy and/or provides a path for other types of electrical signals via conduit C2. The unit 20 is fixedly attached to a skirt or surround 26 which corresponds to the overall form factor of the unit 20.

Figure 3:
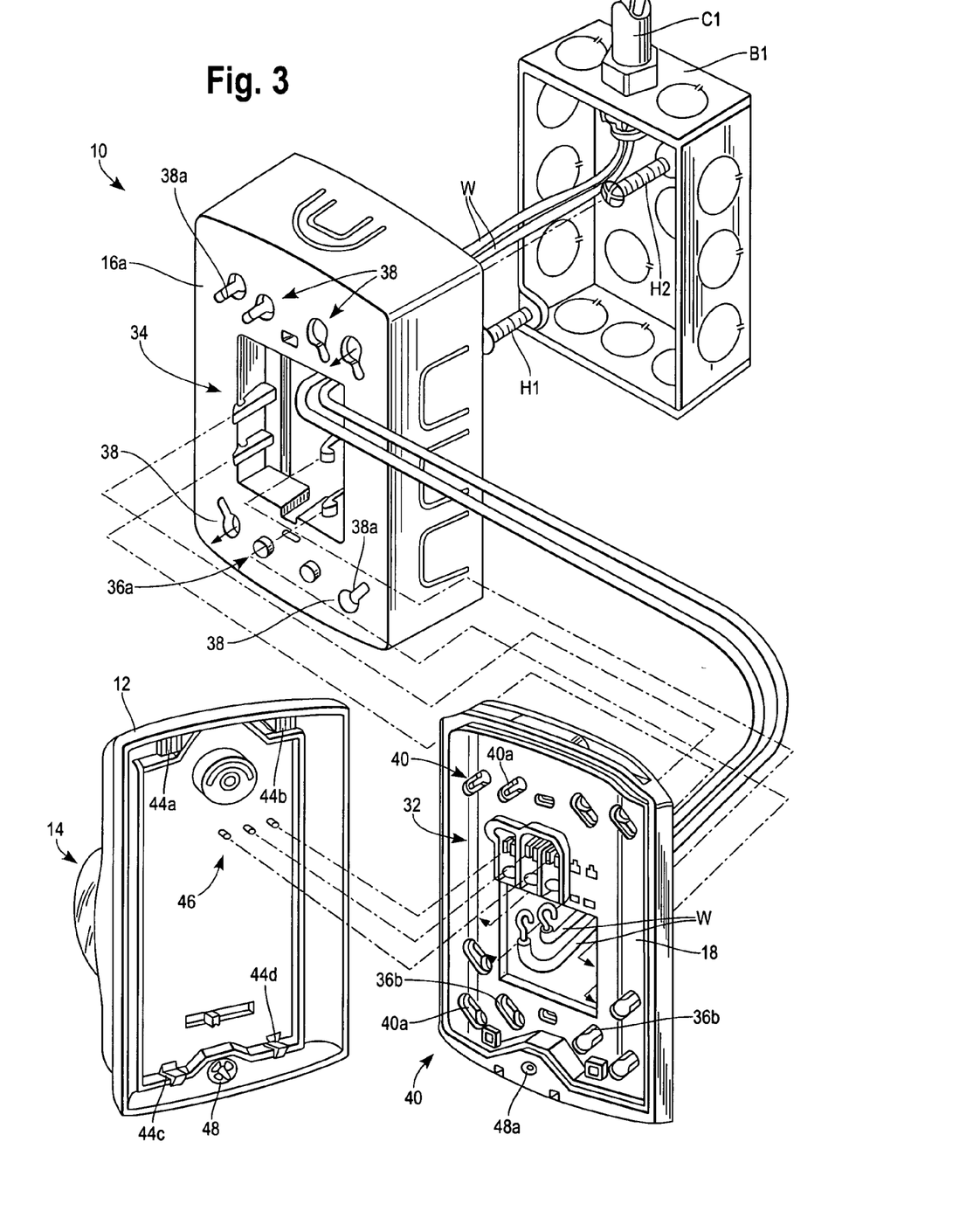
FIG. 3 is an exploded view illustrating further details of the connection system of FIG. 1.
Figure 4:
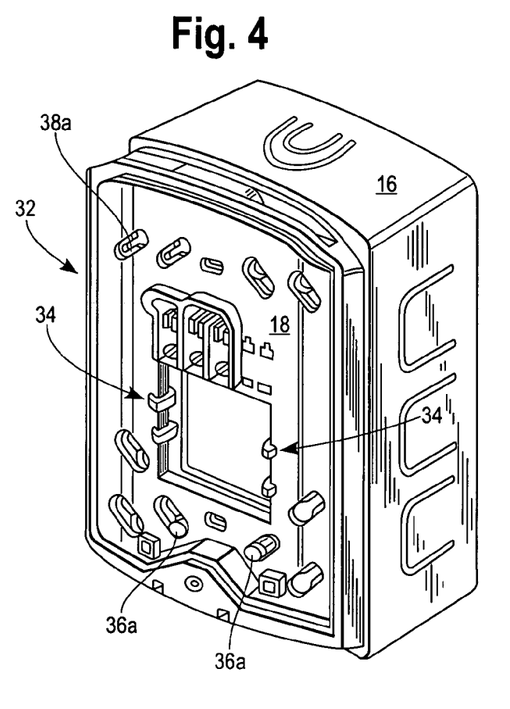
FIG. 4 is a perspective view of a surround and a connector plate of the type usable in the configuration of FIG. 3.
Figure 4A:
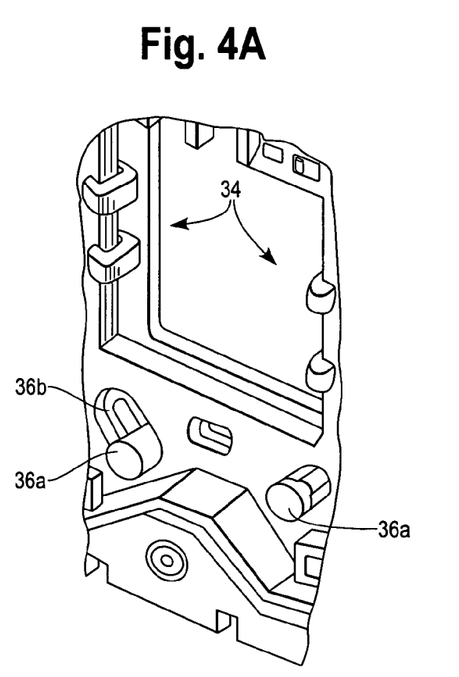
FIG. 4a is an enlarged partial view of a portion of the connector plate of FIG. 4.
Figure 5:
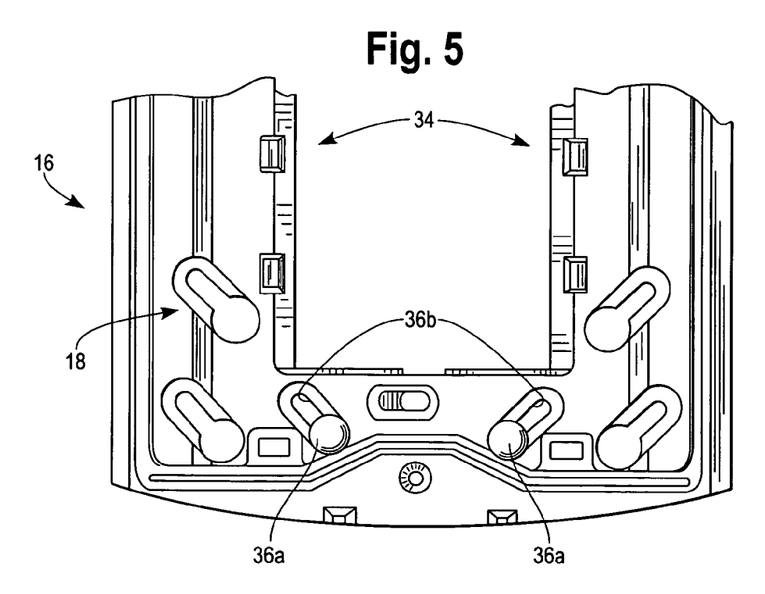
FIG. 5 is a partial front elevational view of the combined surround and mounting plate of FIG. 4.

FIG. 3 illustrates additional details of the configuration with the unit 10. The interface or mounting plate 18, see FIG. 3, carries terminals 32 having a selected number of electrical connections as well as a predetermined form factor. Alternately, a terminal block can be used.

The plate 18 slidably engages the surround or housing 16 and is releasably attached thereto by a plurality of deflectable coupling members 34. It will be understood that the members 34 could define a plurality of different engagement shapes for purposes of releasibly engaging the plate 18 all without limitation.

A plurality of bosses 36a can be formed on an outwardly facing surface 16a of the skirt or surround 16. The plate 18 carries a plurality of alignment receptacles 36b which slidably engage respective ones of the bosses 36a to provide alignment between the surround 16 and plate 18. It will be understood that the deformidable members of 34 could be replaced with alternate types of connectors including additional bosses which could slidably engage the plate 18 with an interference fit all without limitation.

The surface 16A also defines a plurality of keyed openings 38. Corresponding keyed openings 40 are formed on plate 18.

During installation, an installer can attach plate 18 to skirt 16 as described above. Screws or fasteners H1, H2 can be rotatably attached to threaded openings on box B1. In this configuration, as illustrated in FIG. 3, the heads of the respective screws or fasteners H1, H2 extend from the box B1.

The combined surround 16/mounting plate 18 can be mounted on the box B1 with the fasteners H1, H2 extending therefrom and through the respective keyed slots 38, 40. The keyed slots 38, 40 include respective locking portions 38a, 40a which can engage the respective heads of the fasteners H1, H2 in response to rotating the surround 16/plate 18 combination as would be understood by those of skill in the art, best seen in FIGS. 8A, 8B.

Figures 8A, 8B:
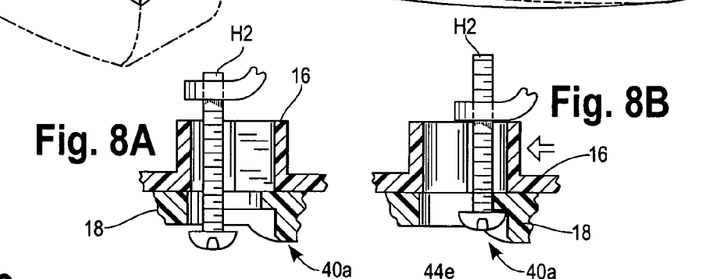
FIGS. 8a and 8b are sectional views of a portion of the structure of FIG. 7 taken along plane 8—8 in different installation configurations.

The heads of the fasteners H1, H2 can then be rotated into position adjacent to the respective surfaces 40A thereby fixedly attaching surround 16/plate 18 to the box B1. At this time the installer can connect the wiring W from the electrical box B1 to the respective terminal block or connectors 32. It will be understood that the number and configuration of the connectors 32 are not limitations of the present invention.

Figure 9:
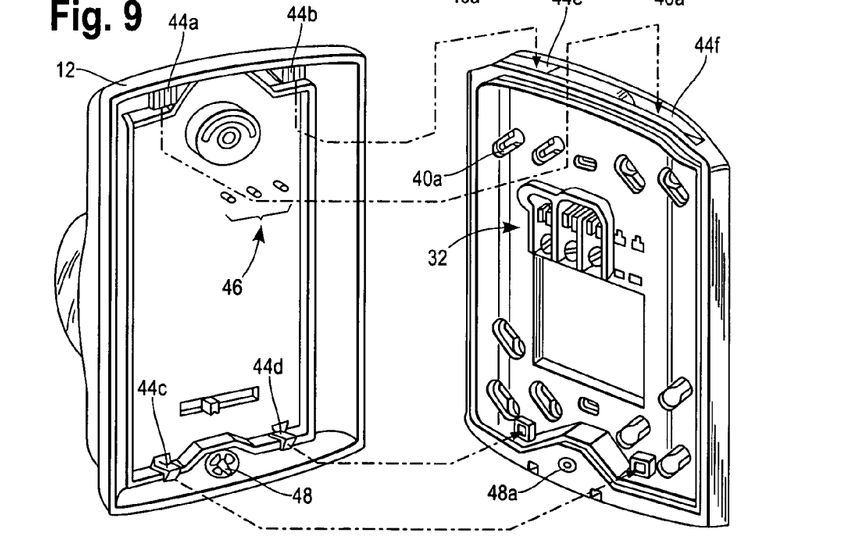
FIG. 9 is an isometric view illustrating coupling between an electrical unit and respective mounting plate.

Finally, the installer can releasibly attach the housing 12 to the plate 18 via flanges 44a, 44b, slots 44e, f and deflectable hooks 44c, 44d best seen in FIG. 9. In the process, an electrical connector 46 carried by housing 12 slidably engages a portion of the terminal block 32 thereby placing wires W into electrical conduction with the electrical components carried by the housing 12 (via connector 46).

One or more fasteners such screws 48 which extend through housing 12, can rotatably engage an aperture of 48a on the plate 18 to fixedly attach the housing 12 thereto. Other attachment structures come within the spirit and scope of the invention.

Figure 6:
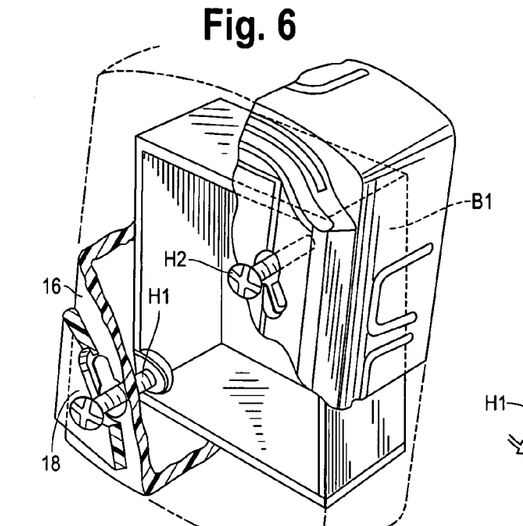
FIG. 6 is a perspective view partially broken away and partially in phantom illustrating coupling a surround and mounting plate, as in FIG. 3, to a surface mounted electrical box.
Figure 7:
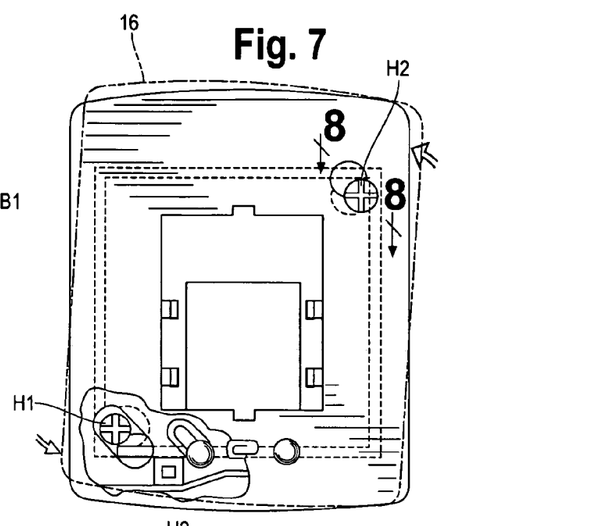
FIG. 7 is a front elevational view of the structure of FIG. 6 illustrating rotating the structure of FIG. 6 into a locking position.

FIGS. 6–8 illustrate various aspects of the above described engagement of the housing 16, and plate 18 with the fasteners H1, H2.

Figure 10:
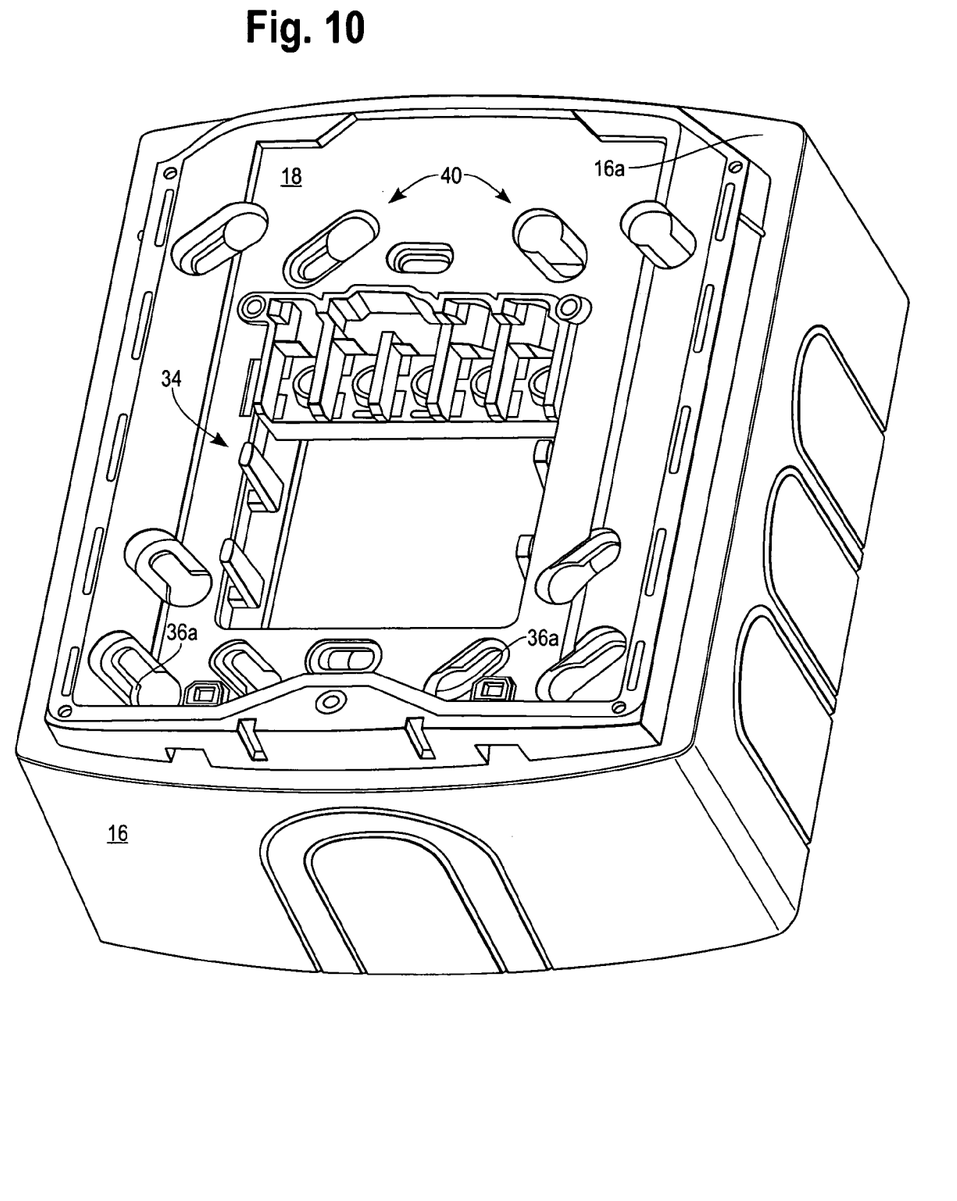
FIG. 10 is a perspective view which illustrates additional details of the interconnection between a surround and associated mounting plate.

FIG. 10 illustrates additional details of the coupling arrangement between the skirt or surround 16 and connection plate 18.

Figure 11:
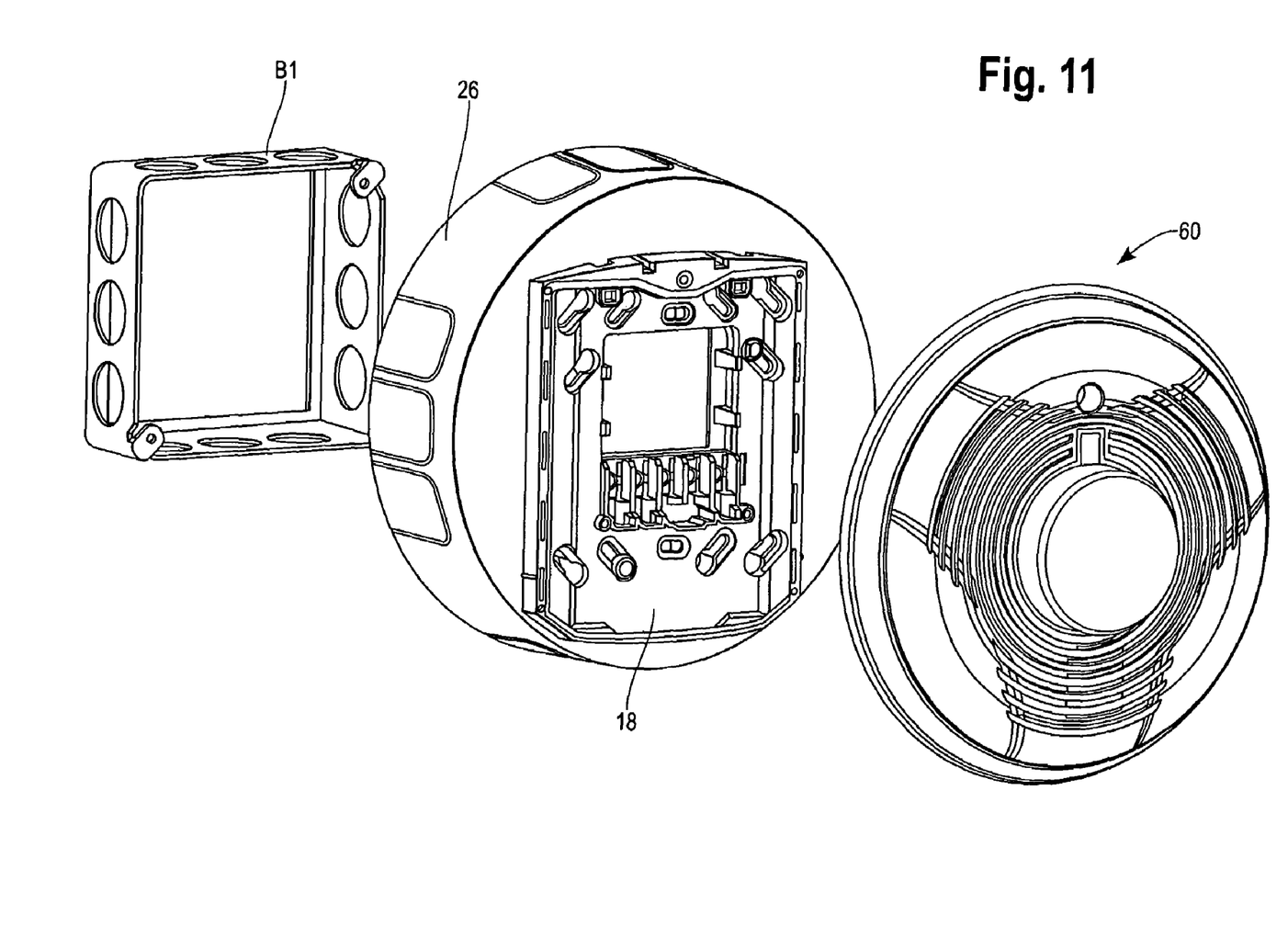
FIG. 11 is a exploded view illustrating connection of yet another type of electrical unit to a surface mounted electrical box using a surround and mounting plate of a type similar to that of FIG. 2.
Figure 12:
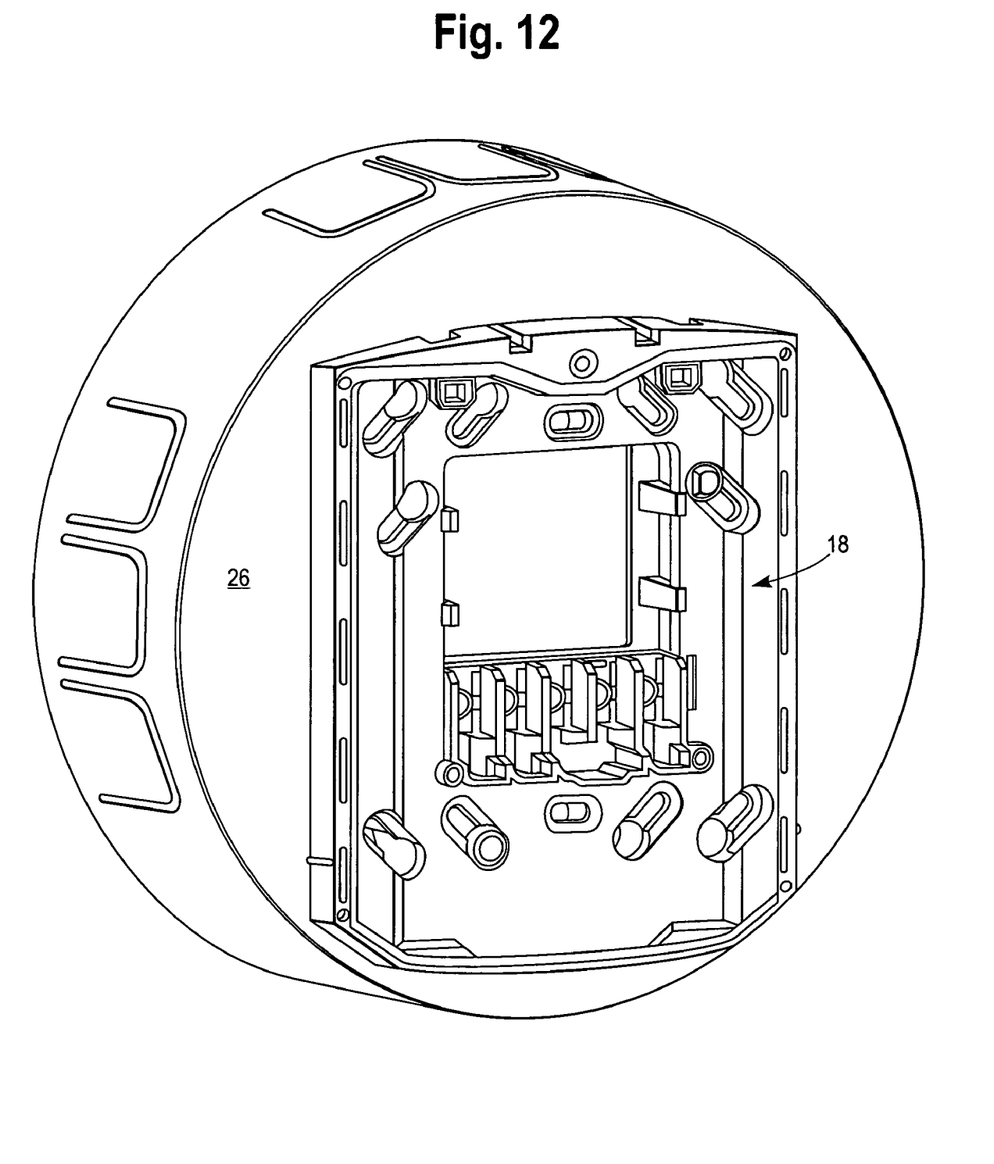
FIG. 12 is a perspective view illustrating further details of the mechanical interconnection between mounting plates such as plate 18 and an associated circular surround 26.

FIGS. 11 and 12 illustrate various aspects of coupling an alternate form of an electrical unit, such as an ambient condition detector 60 via skirt or surround 26 and connection plate 18 to yet another electrical box B3. The unit 60 could be coupled to an associated alarm system via cables or wiring from a surface mounted box, such as box B1 as described above relative to wires W shown in FIG. 3. Hence, the functionality of the electrical unit such as 10, 20 or 60 can vary widely all without limitation. What is required is that the respective electrical units have an interface region compatible with the structural requirements of the connector plate 18.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A connection apparatus comprising:
   a housing which defines a partly bounded interior region, the housing having an outwardly directed surface with an opening therethrough;
   a connector element which carries a first plurality of electrical connectors, the connector element is releasibly attachable to the housing adjacent to the surface; and
   an electrical unit which carries a second plurality of connectors, which releasibly engage at least some members of the first plurality of electrical connectors, the electrical unit is fixedly attachable to at least the connector element where one of the housing or the connector element carries a deflectable member which releasibly engages the other of the connector element or the housing.

2. An apparatus as in claim 1 where the housing and the connector element each define sets of apertures which overlay one another when the connector element is attached to the housing.

3. An apparatus as in claim 2 which includes at least one fastener which extends through an aperture in the housing and the connector element.

4. An apparatus as in claim 1 where the connector element defines a second opening which is aligned with the opening when the connector element is attached to the housing.

5. An apparatus as in claim 4 where members of the first plurality of connectors have sections which are couplable to a source of electrical energy.

6. An apparatus as in claim 1 where the housing includes one of four sides, or a cylindrical section, adjacent to the outwardly directed surface, and, where the interior region is in part bounded by one of the four sides, or, the cylindrical section.

7. An apparatus as in claim 1 where the interior region is configured to receive an electrical connection box of a predetermined height, width and depth.

8. An apparatus as in claim 1 where the electrical unit comprises at least one of an audible output device, a visual output device, an audible and visible output device or an ambient condition detector.

9. An apparatus as in claim 1 where members of the first plurality of electrical connectors include a wire receiving region and a connection region.

10. An apparatus as in claim 9 where the connection region slidably receives a respective conductor carried by the electrical unit.

11. An apparatus as in claim 9 where the housing includes a plurality of deflectable members, the members slidably engage portions of the connector element releasibly attaching same to housing.

12. An apparatus as in claim 11 where the connector element defines a plurality of keyed apertures for receipt of a fastener.

13. An apparatus as in claim 12 where the apertures define a first section through which a fastener head can pass and a second section through which a fastener body, but not the head, can pass.

14. An apparatus as in claim 13 where the interior region is configured to receive an electrical connection box of a predetermined height, width and depth.

15. An apparatus as in claim 1 where the electrical unit slidably engages the connector element.

16. An apparatus as in claim 15 where one of the electrical unit or the connector element carries an engagement flange and the other carries a flange receiving slot.

17. An apparatus as in claim 15 where one of the housing or the connector element carries at least one alignment protrusion and the other carries an alignment protrusion receiving opening such that the connector element is aligned relative to the housing.

* * * * *